Patented Apr. 27, 1954

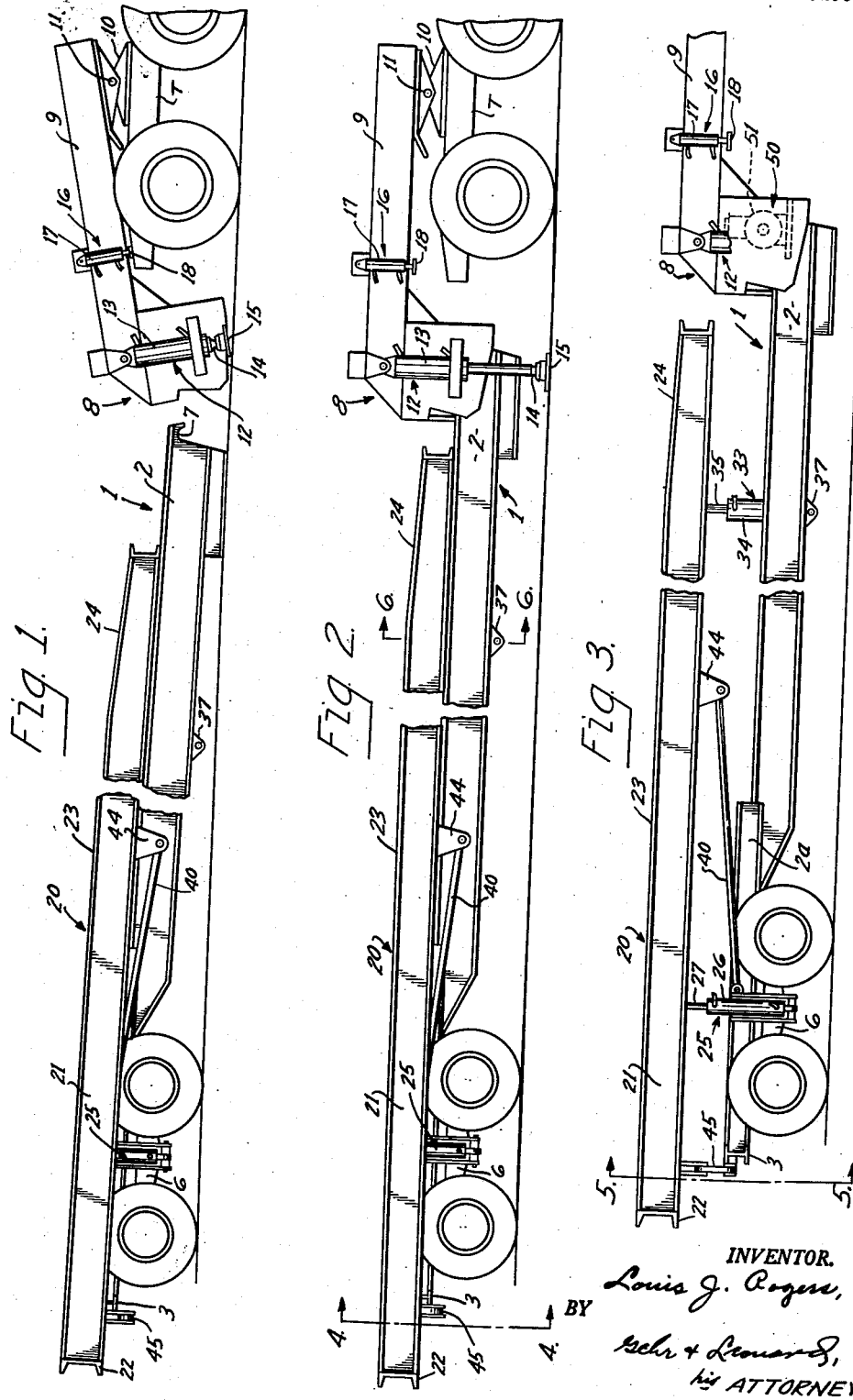

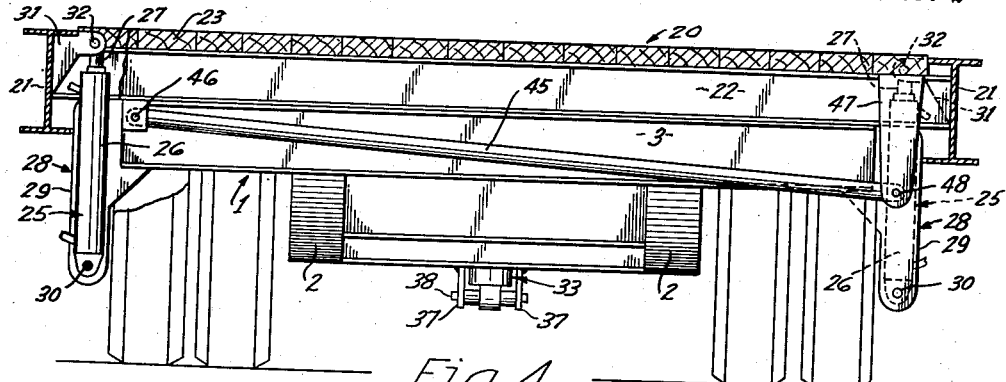
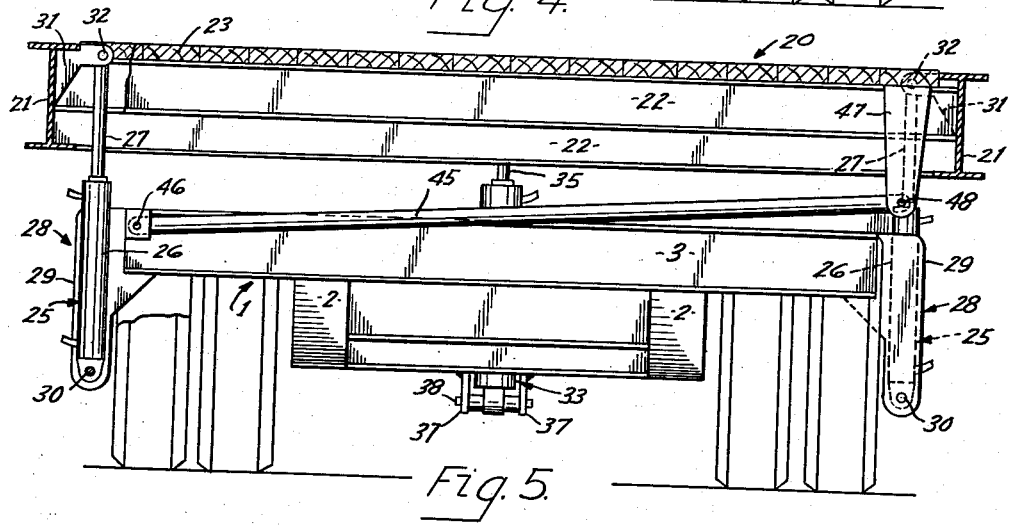
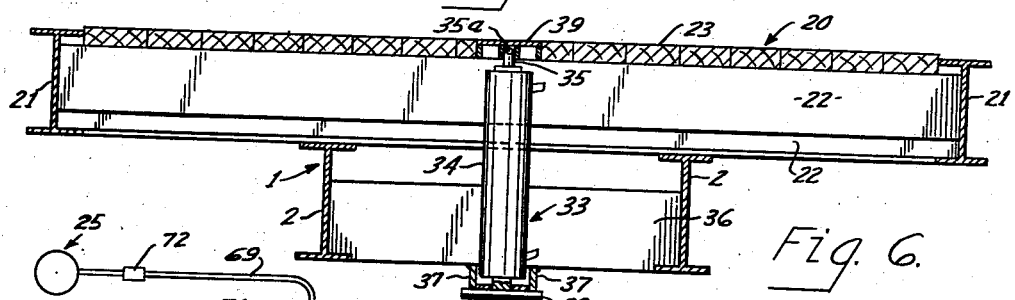
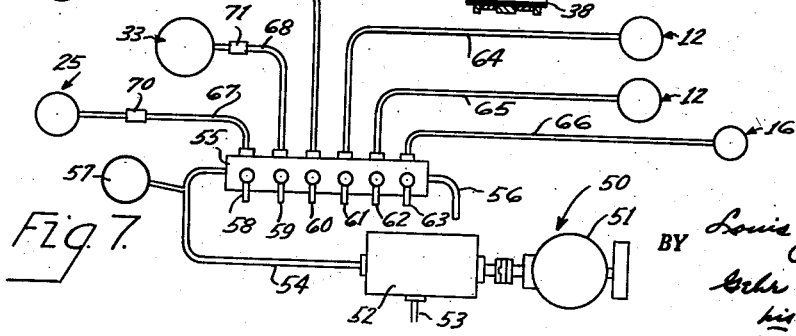

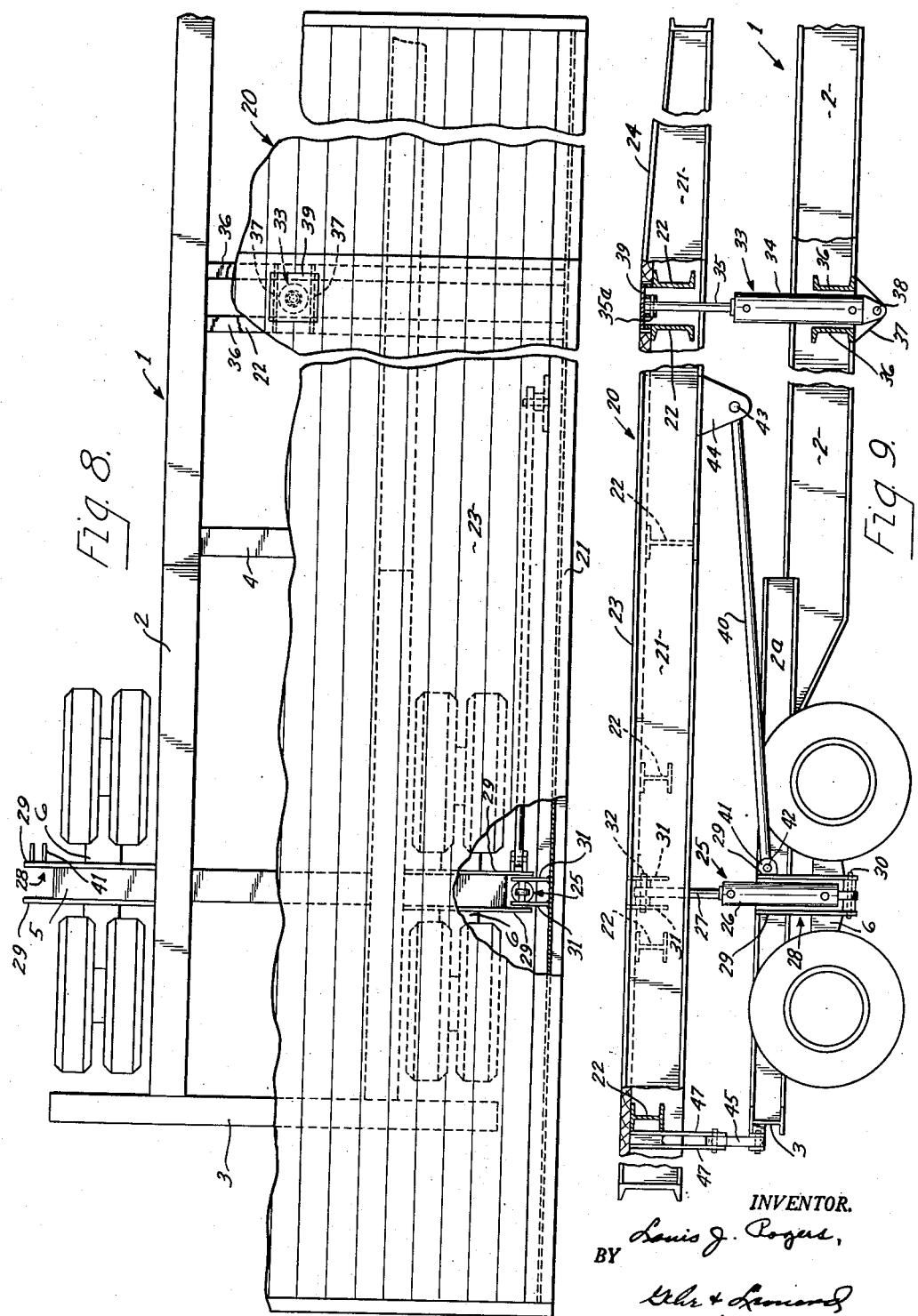

2,676,783

UNITED STATES PATENT OFFICE 2,676,783

HEAVY DUTY TRAILER WITH ELEVATING DECK

Louis J. Rogers, Albion, Pa., assignor to Rogers Brothers Corporation, Albion, Pa., a corporation of Pennsylvania Application February 24, 1951, Serial No. 212,599

2 Claims. (Cl. 254—2)

1

This invention relates to heavy duty low bed trailers such as the heavy duty trailer disclosed in the copending application of Hugh L. Rogers, Serial No. 129,614, filed November 26, 1949, now Patent No. 2,590,210.

Heavy duty low bed trailers of the general character described are used for hauling extremely heavy loads and, due to problems of loading and unloading, stability of the loaded trailer, limitations of overhead clearance by bridges and the like, the bed of the trailer is kept as low as possible consistent with adequate size and carrying capacity of wheels. Frequently, it happens that the load is to be discharged from the load carrying deck of the trailer onto a platform or vehicle, the elevation of which is considerably above the level of the load carrying deck of the trailer.

For example, in the present state of development of airplane freight transportation, it is a frequent practice to carry heavy duty equipment, such as bulldozers and the like, in the airplanes, particularly under war conditions. However, the doors of the freight carrying planes are usually quite limited in size and overhead clearance and the like within the plane also are quite limited. Likewise, the lower limit of the door of a freight carrying plane of such capacity is a substantial distance off ground and at an elevation greater than is practical for the deck of heavy duty trailers of the character described. Due to these and other factors, it is generally necessary to elevate the load in some manner so that the base on which the load rests is substantially at the level of the lower limit of the door of the airplane, and to support the load at such elevation with its base substantially level so that it can be moved through the door without tilting.

Heretofore, it has been necessary to block up such load on the trailer deck to the required level before moving the load from its support into the airplane.

The present invention is concerned with a low bed trailer of the general character described having an elevating load carrying deck mounted on the usual bed or load carrying frame and on which the load is carried, the deck being arranged to be moved vertically to an elevated position above the frame while maintained substantially horizontal.

More specifically, the invention relates to a trailer having a load carrying frame with supporting wheels near the rear thereof and a gooseneck supporting the other end of the frame and adapted to rest upon and be connected to the rear of the tractor by the usual fifth wheel, an elevat-

2 ing deck on the frame, power operated extensible compression means operatively interconnecting the frame and deck so as to raise and lower the deck, selectively, relative to the frame, and means to maintain the deck in horizontal position and in vertical alignment with its starting position during raising and lowering. If desired, for convenience in loading onto the deck, the gooseneck may be detachably connected to the trailer in a manner fully disclosed in the copending application of Hugh L. Rogers, above identified, now Patent No. 2,590,210.

More specifically, the invention comprises an elevating deck adapted to rest upon the trailer frame and provided with three independently controllable hoists which interconnect the deck and frame and are located at widely separated positions with respect to each other so as to provide a three-point elevating support for the deck by which it can be elevated and maintained horizontal during elevation, suitable means being provided to maintain the deck in longitudinal and lateral alignment with its starting position during lifting and lowering.

Other objects and advantages of the invention will become apparent in the following description, wherein reference is made to the drawings in which:

Fig. 1 is a side elevation of a detachable gooseneck type of trailer embodying the principles of the present invention, the detachable gooseneck being shown connected on a tractor and detached from the trailer so that the trailer can be loaded over the front end;

Fig. 2 is a view similar to Fig. 1 but showing the gooseneck attached to the forward end of the trailer and elevated to normal load carrying position by an extensible compression means on the gooseneck;

Fig. 3 is a view similar to Fig. 2 showing the supplemental deck in elevated position;

Fig. 4 is a cross sectional view of the trailer illustrated in Fig. 1, as indicated by the line 4—4 of Fig. 2;

Fig. 5 is a cross sectional view of the trailer with the supplemental deck elevated, as indicated by the line 5—5 in Fig. 3;

Fig. 6 is a sectional view taken on the line 6—6 of Fig. 2;

Fig. 7 is a flow diagram showing the manner of supplying power to the gooseneck hoists and the hoists for the supplemental deck;

Fig. 8 is an enlarged fragmentary top plan view of the trailer illustrated in Fig. 1, part of the supplemental deck being broken away for clearness in illustration; and Fig. 9 is a front elevation of the structure shown in Fig. 8.

Referring to the drawings, the trailer comprises essentially a main or load carrying frame, indicated generally at 1, formed preferably by two main longitudinal sills 2, connected together by suitable transverse beams 3 and 4 and a transverse wheel supporting or walking beam 5.

Connected to the walking beam 5 are longitudinal wheel supporting beams 6 which are arranged to rock about an axis extending transversely of the frame. Mounted on the forward and rearward ends of each beam 6 are the usual pairs of wheels which are adapted to rock about the axis of their associated wheel supporting beams 6.

The trailer may have a permanently attached gooseneck or a detachable gooseneck. The detachable gooseneck type, such as described in the above identified application, Serial No. 129,614, filed November 26, 1949, now Patent No. 2,590,210, is shown for illustration. In this type the forward end of the longitudinal sills 2 are provided with downwardly facing coupling members 7 which are arranged to interengage with suitable coupling members, not shown, at the lower rear portion of a detachable gooseneck 8. These coupling members are arranged so that, with the forward end of the frame 1 lowered close to the ground and below normal load carrying position, the gooseneck 8 can be moved to dispose its coupling member beneath the coupling member 7 for connection therewith upon limited upward movement of the rear portion of the gooseneck 8, and for lifting the forward end of the frame 1 by the gooseneck 8 upon continued upward movement of the gooseneck. The gooseneck 8 has a forwardly extending portion 9 which is adapted for connection to a fifth wheel 10 on the rear of a tractor T so as to rock about the transverse axis 11 of the fifth wheel 10.

At the rear the gooseneck 8 is provided with extensible compression means 12 which may be in the form of double acting hydraulic piston and cylinder assemblages, each assemblage comprising a cylinder 13 connected to the gooseneck 8 at the rear thereof so as to depend therefrom, and a piston 14 mounted in the cylinder. The piston 14 is provided with a ground engaging foot 15 whereby, by operation of the extensible compression means 12, the rear of the gooseneck 8 can be elevated to engage its coupling member with the coupling member 7 and to elevate the forward end of the trailer frame 1. If desired, a supplemental piston and cylinder assemblage 16 may be provided on the forward portion of the gooseneck, the assemblage 16 having its cylinder 17 connected to the gooseneck and its piston 18 engaging the rear of the tractor frame. This supplemental piston and cylinder assemblage 16 is provided for lifting the gooseneck a considerable distance above the ground when it is disconnected from the trailer so that it can be moved out of the way by the tractor.

The structure thus far described, except for the assemblage 16, is disclosed in the above identified pending application and forms no part of the present invention. However, it is desirable in connection with the present invention because exceedingly heavy loads are to be handled and loading of the trailer over the front end is desirable.

Referring particularly to the present invention, there is provided on the usual load carrying or main frame 1 of the trailer, a supplemental frame 20, the frame 20 comprising longitudinal sills 21 with suitable transverse bracing beams 22 distributed along the length of the sills 21 and connected thereto so as to provide a rigid load carrying structure. The supplemental frame is floored with a suitable planking which provides a load supporting deck 23. The upper surface of the deck 23 of the supplemental frame 20 preferably slopes downwardly at a slight incline, as indicated at 24, near its forward end for convenience in loading. Further, the supplemental frame 20 preferably terminates at its forward end short of the forward end of the main load carrying frame 1 so as to afford space for suitable blocking to continue the incline of the deck 23 down to the level of the load carrying frame 1.

The supplemental frame is arranged so that its transverse beams 22 lie across the sills 2 of the trailer, thus supporting the supplemental frame thereon in the normal lowered position of the supplemental frame.

It is to be noted that, in the form illustrated, the wheel carrying portion of the main frame 1 is raised slightly above the level of the remainder so as to accommodate larger wheels, suitable extension sills 2a, forming extensions of the sills 2, being provided and that the rear transverse beams which rest on the extension sills 2a are of less depth than the beams which rest on the sills 2.

Referring next to the manner of connecting the supplemental frame 20 to the main frame 1, it is to be noted that for the heavy loads involved it is difficult to lift such a supplemental frame by a plurality of distributed extensible compression means while maintaining it horizontal. To lift it by a single extensible compression means results in severe stresses from overbalance, overhang and resultant deflection of the supplemental frame as a whole or in part. If it is attempted to use four such extensible compression means, arranged near the corners of the supplemental deck, it is very difficult to operate them so as to effect concurrently the same amount of extension and retraction of each. If equal movement of all four is not obtained, the frame 20 will rock in any guideways provided and thereby become jammed and inoperative. In accordance with the present invention therefore, a three-point elevating support for the supplemental deck is provided.

Referring particularly to Figs. 3 through 6, a suitable form of three-point elevating support is illustrated, the extensible compression means used for this purpose being double acting, fluid pressure operated piston and cylinder assemblages, hydraulic fluid being preferred.

It is desirable that the three points at which the three-point support engages the frame 20, be widely separated from each other and balanced in position relative to the central portion of the supplemental frame 20. Likewise, it is desirable that the thrust transmitted from the supplemental frame 20 through the extensible compression means to the load carrying frame 1 be applied to the load carrying frame advantageously.

In the form illustrated, these features are accomplished by arranging extensible compression means near the lateral margins, respectively, of the supplemental frame 20 at a location aligned vertically with the walking beam 5 of the main frame 1 so that the greater portion of the weight of the load can be applied most nearly directly to the wheels of the trailer, and to provide another extensible compression means near the forward end of the supplemental frame 20 and load carrying frame 1.

As shown, the extensible compression means at the rear lateral margins of the supplemental frame 20 comprise reversible hydraulically operated piston and cylinder assemblages 25, each including a cylinder 26 and a piston 27. Mounted near each end of the walking beam 5 are stirrups 28, each of these stirrups being in the form of relatively heavy plates 29 arranged forwardly and rearwardly from each other, as best illustrated in Figs. 5 and 9. The plates 29 of each stirrup are connected at their upper ends to the walking beams 5 so as to depend therefrom and are located as near as practical to the ends of the walking beams. The cylinder 26 of each assemblage 25 is mounted in upright position between its associated plates 29, being connected thereto at its lower end by means of a pivot 30 extending forwardly and rearwardly of the trailer. Connected to each sill 21 of the supplemental frame 20 are suitable gussets 31 to which the piston 27 of the associated assemblage 25 is connected by a suitable pivot 32. The pivots 30 and 32 of each assemblage are aligned vertically with each other.

At the forward portion of the main frame 1, another extensible compression means 33 is provided and comprises a reversible hydraulic piston and cylinder assemblage, having a cylinder 34 and piston 35. The main frame 1 of the trailer is provided with transverse beams 36 which extend between the longitudinal sills 2. Secured to these beams 36 and depending therefrom are plates 37 which provide a stirrup for the forward assemblage 33. The cylinder 34 is connected at its lower end to, and between, the plates 37 by means of a pivot 38, the plates 37 being so positioned that the cylinder is arranged at the transverse midportion of the supplemental frame 20 and main frame 1. Mounted between the transverse beams 24 of the supplemental frame and connected thereto is a thrust plate 39 to which the piston 35 is connected by means of a pivot 35a. Thus, upon operation of the assemblages 25 and 33, the supplemental frame 20 can be raised to a predetermined position and lowered so as to rest on the main frame 1 of the trailer.

As will later be explained, pressure fluid can be admitted to each of the assemblages 25 and to the assemblage 33 independently and in controlled amounts by suitable valves so that the pistons can be lifted or lowered substantially concurrently in equal increments regardless of the unbalanced condition of the load on the frame 20.

It is to be noted that the assemblages 25 can be rocked transversely of the trailer and the assemblage 33 can rock forwardly and rearwardly of the trailer. Thus the pistons and cylinders can adjust themselves to the slight changes in alignment that might be due to a slight difference in the increment of movement of the pistons relative to each other. However, since a three-point support is provided, binding and jamming of the pistons due to tilting of the supplemental frame 20 is practically eliminated so long as the supplemental frame 20 is kept in proper alignment above the main frame 1.

In order to maintain the supplemental frame 20 in proper alignment above the main frame 1 while eliminating the possibilities of binding of any guide means used therefor, the stabilizing means shown in the drawings is preferred. The stabilizing means for preventing movement of the supplemental frame 20 longitudinally of the load carrying frame 1 may comprise suitable rods 40 arranged one near each margin of the supplemental frame 20, alongside and near to the sills 21. Each rod 40 is connected at one end to the main frame 1 and at the other end to the supplemental frame 20. As best illustrated in Fig. 9, the rod 40 is connected to the main frame by means of a yoke 41, secured on the stirrup or plate 29, and a pivot 42. The rod 40 is pivotally connected at the other end by means of a pivot 43 to a suitable depending gusset 44 on the longitudinal sill 21. The rods 40 thus connected constrain the supplemental frame 20 from movement forwardly and rearwardly relative to the main frame 1 of the trailer during lifting and lowering. The rods preferably are made relatively long and the pivots 42 and 43 are positioned so that, when the supplemental frame 20 rests on the main frame, the pivot 43 is substantially the same distance below a horizontal plane through the pivot 41 as it is above such plane when the extensible compression means are fully extended and the supplemental deck is in fully elevated position. Thus the travel of the pivot 43 forwardly and rearwardly of the trailer due to its arcuate path about the pivot 42 is negligible and is taken up in elastic deformation of the various parts of the structure.

In order to constrain the supplemental frame 20 from movement transversely of the main frame 1, a similar rod 45 is provided at the rear of the trailer. The rod 45 is pivotally connected by a pivot 46 to the main frame 1 of the trailer, near one lateral margin. At the opposite side of the trailer, the supplemental frame is provided with a depending gusset or yoke 47 to which the other end of the rod 45 is connected by means of a pivot 48. In this instance, also, the pivots 46 and 48 are preferably so positioned vertically that the pivot 48, in swinging about the pivot 46, moves about the same distance below a horizontal plane through the pivot 46 as it does above the level thereof as the supplemental frame moves from fully lowered to fully raised position. Thus the migration or travel of the pivot 48 in a direction transversely of the trailer due to its swinging in an arc about the pivot 46 is limited to a negligible amount.

While fluid pressure may be supplied to the cylinders from suitable means on the truck, it is preferred to provide a power plant and a pump on the gooseneck for supplying the hydraulic pressure fluid. For this purpose, there is mounted on the gooseneck between the lateral limits of the rear portion thereof a suitable pumping and valving mechanism, indicated generally at 50. This mechanism comprises a suitable gasoline motor 51 connected to a suitable rotary pump 52 to which hydraulic fluid is supplied through a pipe 53 from a suitable reservoir. Leading from the discharge side of the pump is a pipe 54 which leads to a selective valve 55, the valve 55 being connected by a return pipe 56 to the supply reservoir or sump. The usual surge reservoir 57 is connected in the line 54 for maintaining a more uniform delivery of hydraulic fluid under pressure to the selective valve 55. The selective valve head 55 is provided with a plurality of valves 58 through 63, respectively. The valve 58 is connected to one of the assemblages 25, the valve 60 is connected to the other one of the assemblages 25, and the valve 59 connected to the assemblage 33. Each of the valves is operable independently and selectively to connect the line 54 to either side of the piston of its assemblage for supplying pressure fluid thereto, to disconnect the line 54 from its assemblage and stop the flow to or from the assemblage, and to disconnect the pipe 54 from its assemblage and connect its assemblage to the return line 56. Correspondingly, the valves 61 and 62 are connected one to each of the assemblies 12 so as to operate in a like manner. The valve 63 is connected to the assembly 16 and also operates in a like manner. Thus each assemblage can be controlled, independently, so as to be extended, retracted, or hydraulically locked in any selected position.

Suitable pipes 64, 65, and 66 connect the valves 61, 62 and 63 to their respective assemblages, these connections being permanent. However, since the gooseneck 8 is often removed from the front of the trailer frame 1 and moved to one side so as to make possible the loading of the trailer over the front end, the valves 58, 59 and 60 are preferably connected to their assemblages by means of flexible hoses 67, 68 and 69, respectively. These hoses are provided with the well known quick make and break connectors 70, 71 and 72 which are arranged not only to make and break very quickly the connection between the portions of the hose in which used, but also to seal the pressure side of the line to prevent leakage of the pressure fluid when the connection is broken.

In operation, therefore, all that is necessary is to back the trailer into the position required and, while the main frame 1 is maintained in a horizontal position by blocking or attachment to the tractor, to operate the valves so as to lift the supplemental frame 20 with the load thereon a substantially equal amount concurrently by each cylinder, the frame being maintained in proper position parallel to the plane of the frame 1 by means of the rods 40 and 45. Since three extensible compression means only are provided, the supplemental frame can be maintained horizontal very readily without danger of binding due to overbalances of the load and, if any slight warpage and deflection does occur, it will not interfere with operation of the extensible compression means.

It is to be noted that additional stabilizing rods such as 40 and 45 may be used if desired but generally a single rod at the rear of the frame and one at each side are sufficient.

Having thus described my invention, I claim:

1. In a trailer including a main frame, a walking beam extending transversely of, and substantially to the lateral limits of, the main frame, wheels connected to the walking beam, a weight supporting supplemental frame normally resting on the main frame and supported thereby, dependent stirrups on the ends of the beam, respectively, generally upright piston and cylinder assemblages at opposite ends of the beam, respectively, each assemblage being connected at its lower end to its associated stirrup and at its upper end to the supplemental frame, a third generally upright piston and cylinder assemblage connected at one end to the main frame and at the other end to the supplemental frame and positioned near the front of the supplemental frame, and valve means connected to the cylinders, respectively, and operable independently of each other, each for controlling the admission to, and discharge from, its associated assemblage, of pressure fluid.

2. In a trailer including a main frame, supporting wheels near the rear end of the main frame, and means to support the other end of the main frame, a rigid weight supporting supplemental frame carried by, and overlying, the main frame and movable relative thereto from a lowered to a raised position, three power operated hoists interposed in compression between the frames and interconnecting the frames at widely separated locations with respect to each other and providing a three-point elevating support for the supplemental frame and operable to raise and lower the said supplemental frame relative to the main frame, guide means interconnecting the frames and operable to constrain the supplemental frame to a predetermined path of movement during raising and lowering of the supplemental frame by the power operated hoists, two of said hoists being located near one end of the supplemental frame, one near each lateral limit thereof, and the other of said hoists being located near the other end of the supplemental frame near the lateral mid-portion thereof, each of said hoists being a fluid pressure operated piston and cylinder assemblage, individual valve means for the assemblages, respectively, and each valve means being operative independently of the others to control the admission and discharge of pressure fluid to its associated cylinder.

References Cited in the file of this patent

UNITED STATES PATENTS

| Number | Name | Date |
|---|---|---|
| 1,382,328 | Stone | June 21, 1921 |
| 2,367,817 | Brown | Jan. 23, 1945 |
| 2,369,838 | Minnis | Feb. 20, 1945 |
| 2,389,211 | Pointer | Nov. 20, 1945 |
| 2,443,611 | Ferguson | June 22, 1948 |
| 2,571,213 | Cunningham et al. | Oct. 16, 1951 |
| 2,590,210 | Rogers | Mar. 25, 1952 |
| 2,593,465 | Le Tourneau | Apr. 22, 1952 |

FOREIGN PATENTS

| Number | Country | Date |
|---|---|---|
| 417,112 | Great Britain | Sept. 27, 1934 |